United States Patent
Sawant et al.

(10) Patent No.: US 11,604,626 B1
(45) Date of Patent: Mar. 14, 2023

(54) ANALYZING CODE ACCORDING TO NATURAL LANGUAGE DESCRIPTIONS OF CODING PRACTICES

(71) Applicant: Amazon Technologies, Inc., Seattle, WA (US)

(72) Inventors: Neela Sawant, Bangalore (IN); Sengamedu Hanumantha Rao Srinivasan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 83 days.

(21) Appl. No.: 17/357,839

(22) Filed: Jun. 24, 2021

(51) Int. Cl.
G06F 9/44 (2018.01)
G06F 8/33 (2018.01)
G06N 20/00 (2019.01)
G06F 8/38 (2018.01)

(52) U.S. Cl.
CPC ............... G06F 8/33 (2013.01); G06F 8/38 (2013.01); G06N 20/00 (2019.01)

(58) Field of Classification Search
None
See application file for complete search history.

(56) References Cited

U.S. PATENT DOCUMENTS

| | | |
|---|---|---|
| 11,119,735 B1 * | 9/2021 | Baafi .................... G06F 8/33 |
| 2017/0239576 A1 * | 8/2017 | Hsiao .................. A63F 13/63 |
| 2018/0150768 A1 * | 5/2018 | Togia ................. G06F 40/30 |
| 2019/0095716 A1 * | 3/2019 | Shrestha ............ G06V 20/70 |
| 2020/0111012 A1 * | 4/2020 | Wan ................... G06F 40/30 |
| 2022/0027566 A1 * | 1/2022 | Vaithiyanathan ..... G06F 8/36 |
| 2022/0261241 A1 * | 8/2022 | Balasubramanian ... G06F 8/73 |

* cited by examiner

*Primary Examiner* — Anna C Deng
(74) *Attorney, Agent, or Firm* — S. Scott Foster; Kowert, Hood, Munyon, Rankin & Goetzel, P.C.

(57) ABSTRACT

Code may be analyzed according to natural language descriptions of coding practices. A practice for code written in a natural language description may be received. An embedding of the natural language description may be generated using a machine learning model trained to detect examples of practices. The embedding may be compared with embeddings of code portions stored in an index to detect one or more portions of code that satisfy a facet of the practice. The detected portions of code may be identified.

20 Claims, 10 Drawing Sheets

ANALYZING CODE ACCORDING TO NATURAL LANGUAGE DESCRIPTIONS OF CODING PRACTICES

BACKGROUND

Programming languages offer developers, designers, and other users with the ability to precisely specify the operation of various hardware or software designs for many different applications. Given the wide variety of programming languages, these developers, designers, and other users may encounter or otherwise use code written in a programming language which may be less familiar to the developer. Code development tools offer developers, designers, and other users with different capabilities to improve code performance and identify errors, which may in the exemplary scenario described above, help to overcome a developer's lack of familiarity with a programming language (or an environment in which the programming language is deployed) so that high performing code may still be written.

Figure 1:
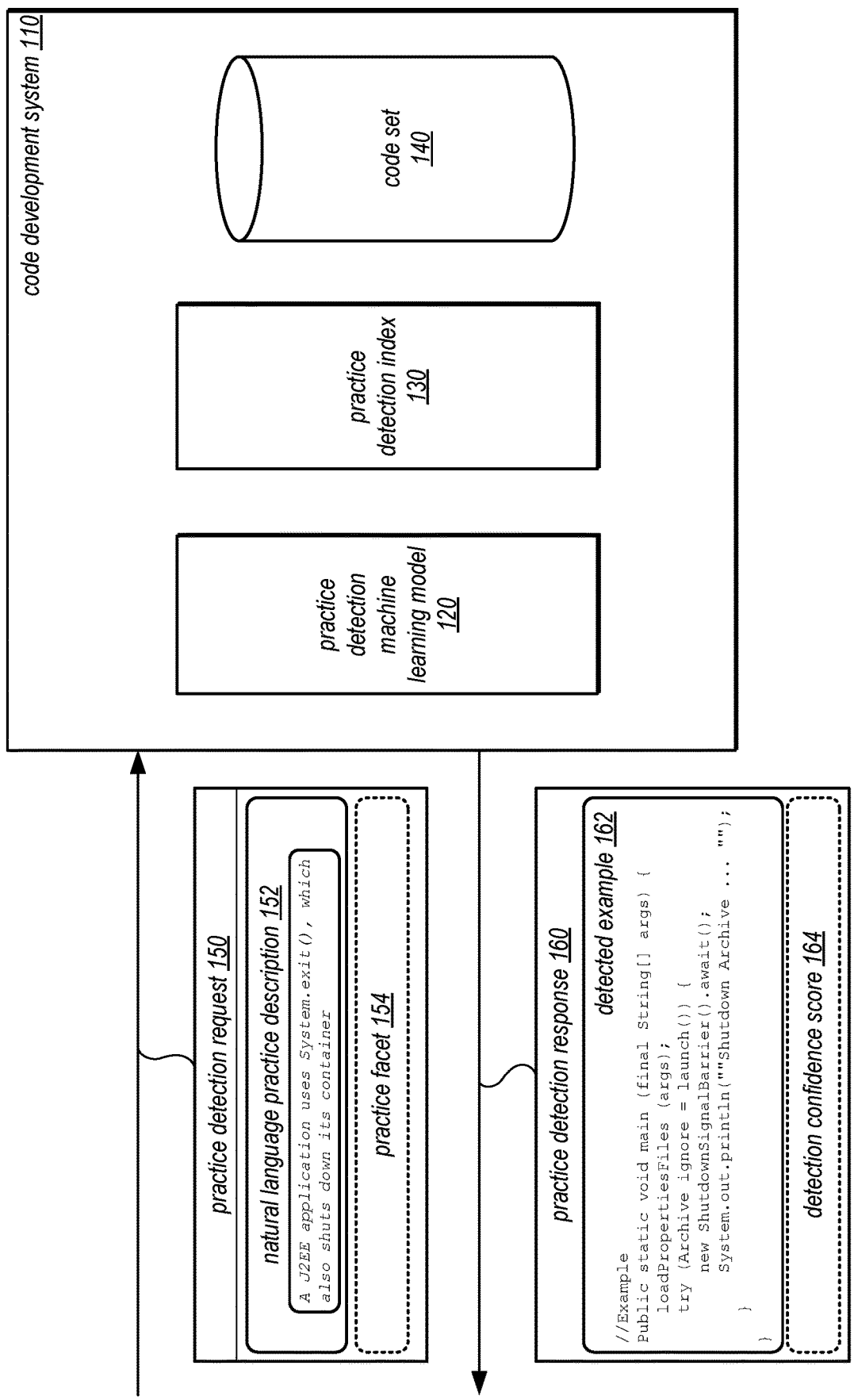
FIG. 1 is a logical block diagram illustrating analyzing code according to natural language descriptions of coding practices, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for analyzing code according to natural language descriptions of coding practices are described herein. Detecting coding issues and promoting best practices provides important performance benefits in software or hardware development. Significant resources are often devoted to this problem in the form of code linting, manual code reviews, static and dynamic analysis, among other techniques. While some systems for automated code analysis and code reviews may rely on expert-curated checkers to determine if a code conforms or violates a coding practice (e.g., best practices for utilizing, design, or specify various features in the code), the creation process of such automated checkers is rigorous and may require the ability to (1) model program data and control flows, (2) manually identify and analyze code examples of each coding practice of interest, and (3) carefully craft static and dynamic analysis rules to evaluate unseen examples. Such approaches may not easily scale to accommodate the increasing number of programming languages being used, as well as the growing number of best practices for programming languages.

Techniques for analyzing code according to natural language descriptions of coding practices may provide a machine learning-based approach using deep learning techniques for identifying whether code conforms to best practices (e.g., either conforming to or violating a best practice). For example, a machine learning model may be used to implement a practice detection development tool, application or other system (e.g., as a neural rule engine) that takes user inputs, such as a natural language description of a coding best practice and, in some embodiments, a facet (e.g., providing a criteria for the identification of code as either conforming or violating the best practice). The practice detection development tool may scan one (or more) code repositories to find code snippets or other code portions that match the coding best practice (e.g., either conforming to or violating the best practice). A development tool implementing techniques for analyzing code according to natural language descriptions of coding practices would provide an automated software engineering solution for code analysis. For instance, such a development tool may allow a user to input a new rule description in natural language and a facet suggestion to retrieve desired examples from unseen code corpus. Moreover, such a development tool could augment the manual rule development efforts (e.g., by determining how to formulate effective best practice rules).

A machine learning model for analyzing code according to natural language descriptions may be trained to learn fine-grained bimodal embeddings, e.g. dense semantic representations of code and text, in some embodiments, that not only approximate the semantic similarity between natural language and relevant examples, but also perform fine-grained differentiation between the conforming and the violating examples (or other classification labels) via the vector distance between their embeddings. The embeddings may be learned by according to various aspects of neural model training: the choice of the training data, the network architecture, and the loss functions. Moreover, training the machine learning model in this way will allow the machine learning model to provide analysis of code using generic inputs. For example, the machine learning model can be trained on pure code text if the rich program behavior signals (control and data flows) are not available to it (for example, when code snippets are incomplete or not able to be compiled).

Machine learning models to implement a development tool to detect coding practices as discussed above may be data-hungry. For example, to train a neural network machine learning model, large training datasets may be needed to achieve high performance. While it may be hard to find curated training examples that show many conforming and violating code snippets per best practice, the machine learning model can be trained with pre-training and fine-tuning on auxiliary datasets, as discussed below. For example, double pre-training on separate natural language and code corpora to independently capture high level structure and semantics of text and code, and fine-training on code repository code review comments containing code-before (buggy) and code-after (fixed) snippets along with a natural language code review comment (e.g., GitHub code comments) may provide data sufficient to create a high performing machine learning model for detecting coding practices using a natural language description. As for evaluation of a trained model, to find data sets that can be used to evaluate the machine learning model, various public and private datasets can be used for quantitative assessment of the rule engine. For example, the Common Weaknesses Enumeration (CWE) dataset containing natural language descriptions of code weaknesses and illustrations can be used, in some embodiments.

FIG. 1 is a logical block diagram illustrating analyzing code according to natural language descriptions of coding practices, according to some embodiments. Code development system 110 may be development environment (e.g., an integrated development environment (IDE) for software and/or hardware code, implemented as a stand-alone application or a cloud-based tool (e.g., as discussed in detail below with regard to FIG. 2) or stand-alone tool or cloud-based tool that evaluates one feature (or multiple features) of code. Code development system 110 may store (or have access to) code set 140, which may be one (or more) types of code storage or other code repositories that store code which may be analyzed for practices as discussed in detail below.

The code in code set 140 may be indexed so that different portions of code set 140 may have corresponding entries in practice detection index 130. The entries of practice detection index 130 may store respective embeddings for the code portions, which may be generated using practice detection machine learning model 120. For example, as discussed in detail below with regard to FIG. 5, these embeddings may be created using an encoder of practice detection machine learning model 120. The entries of practice detection index 130 may then be used to detect examples of different coding practices described in received natural language, even though the practice detection machine learning model 120 may have not been trained on those best practices (e.g., not trained using natural language descriptions of those best practices) or code set (e.g., not trained on those code repositories that are searched/indexed).

A typical programming language has several best practice recommendations related to diverse aspects of programming such as data structures and control flows, exception handling, logging, security, concurrency, input validation, to name a few. Some best practice recommendations in the Java programming language for example are:

Do not catch Throwable.
Crypto algorithms should not make use of MD5 or SHA-1. Use SHA-2 instead.
Do not check if a collection is empty by comparing its size with zero. Use the isEmpty( ) method instead.

Best practice recommendations can be found in diverse online resources (blogs, programming guides, Stack Overflow). High value recommendations are often curated into collections such as Open Web Application Security Project (OWASP), CWE, Juliet Test Suites from National Institute of Standards and Technology, and so on. Detectors for such recommendations may be available.

Such best practices may be searched for using a practice detection request 150. Code development system 110 may implement an interface (e.g., command line, programmatic, and/or graphical) which may allow a user to submit a natural language description of the practice 152. For example, as illustrated in FIG. 1, the natural language description may be "A J2EE application uses System.exit( ), which also shuts down its container." In some embodiments, a facet for the practice, such as facet 154 may be specified (e.g., "conforming," "violating" or other classification/label for the practice) which may be used to filter which code portions to return. In some embodiments, a default facet may be used (e.g., if none is specified).

Code development system 110 may use practice detection machine learning model 120 to generate an embedding of natural language description 152 (along with facet 154), in various embodiments. The generated embedding may be compared with the respective embeddings for different code portions in practice detection index 130. For example, a distance function to measure the distance between the embedding of the natural language practice description 152 and entries in the practice detection index may indicate which portion(s) of code are examples of the described practice (e.g., by having distance values less than some threshold and/or utilizing a ranking of the different distance measurements, where a number of smallest distances are identified). Code development system 110 may then return a practice detection response 160 that may include (or otherwise identify) those code portion(s) that are a detected example 162 that satisfy the facet (e.g., conform to the practice or violate the practice according to what the facet is). In some embodiments, a detection confidence score 164 (e.g., determined from the difference in similarity values between embeddings) may be provided as part of the response 160.

Please note that previous descriptions are not intended to be limiting, but are merely provided as an example of a code development system, natural language practice description, and response.

The specification next includes a general description of a provider network, which may implement a code development service that analyzes code according to natural language descriptions of coding practices. Then various examples of a code development service are discussed, including different components/modules, or arrangements of components/module that may be employed as part of implementing a provider network. A number of different methods and techniques to implement analyzing code according to natural language descriptions of coding practices are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
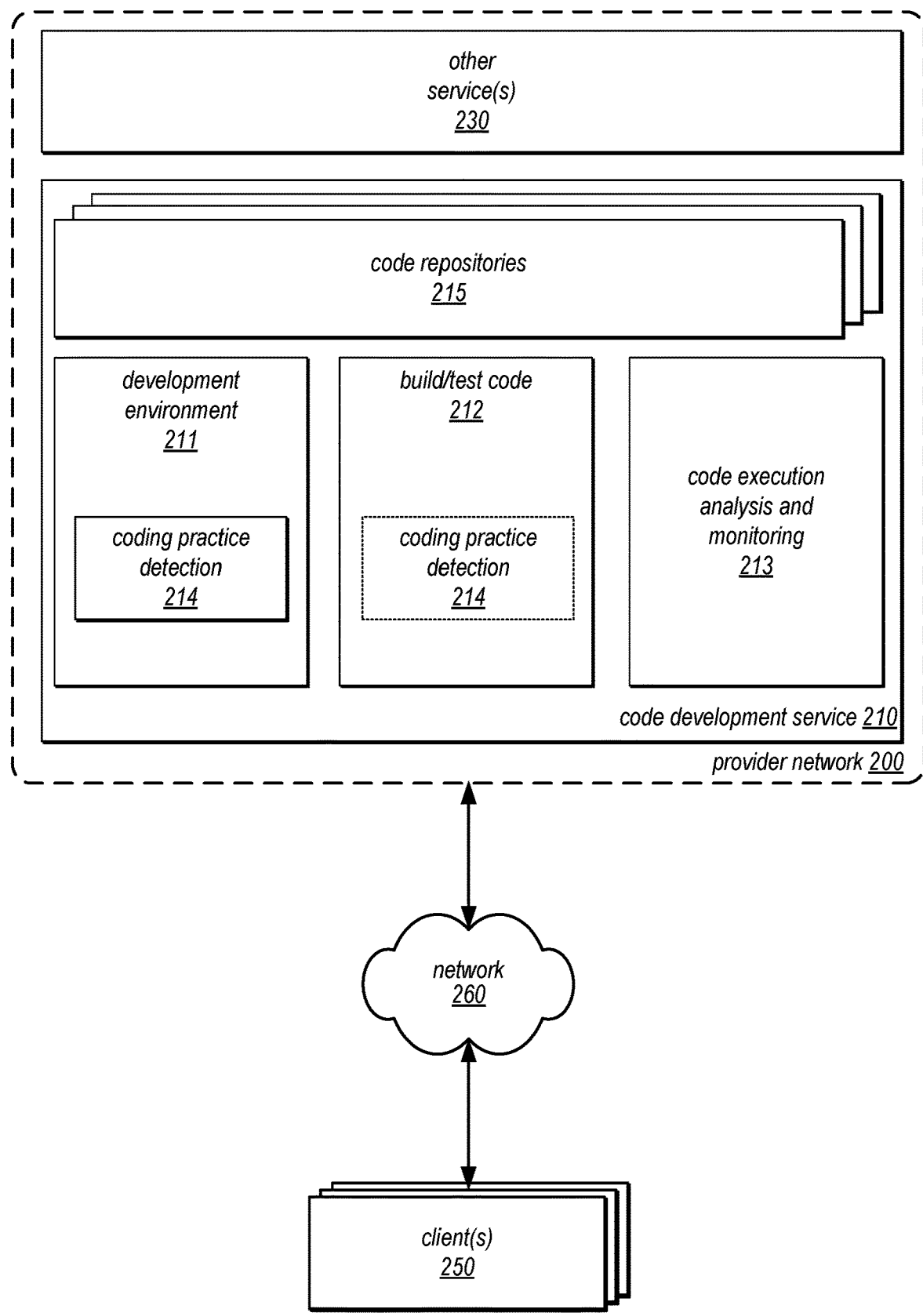
FIG. 2 is a logical block diagram illustrating a provider network that implements different services including a code development service, according to some embodiments.

FIG. 2 is a logical block diagram illustrating a provider network that implements different services including a code development service, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 210 may implement various computing resources or services, such as code development service 210, and other service(s) 230 which may be any other type of network based services, including various other types of storage (e.g., database service or an object storage service), compute, data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service may implement development environment 211. Code development environment 211 may offer various code entry tools (e.g., text, diagram/graphics based application development) to specify, invoke, or otherwise write (or cause to be written) code for different hardware or software applications. As discussed in detail below with regard to FIGS. 3-7, coding practice detection 214 may be implemented as part of development environment 211, in some embodiments.

Code development service 210 may implement build/test code features 212, in various embodiments. Build/test code 212 may, for example, compile and execute code to test for performance problems, bottlenecks, anomalies, cost or expense (e.g., in terms of execution time and/or resource utilization), among other characteristics of code. In some embodiments, coding practice detection 214 may be implemented as part of build/test code 212. For example, a run-time, executable or other version of code may be evaluating using similar techniques to those discussed below with regard to FIGS. 5-8, to detect the existence of best practices as part of build/test.

Code development service 210 may, in some embodiments, implement features to analyze and monitor deployed/executing code, as indicated at 213. For example, code execution analysis and monitoring 213 may monitor for performance anomalies and execution costs for portions of code after the code is deployed as part of a system or other application.

Code development service 210 may implement (or have access to) code repositories 215. Code repositories 215 may store various code files, objects, or other code that may be interacted with by various other features of code development service 210 (e.g., development environment 211 or build/test code 212). For example, coding practice detection 214 may provide detection for code repositories associated with an account and/or specified in a request for coding practice detection in some embodiments. Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request for practice detection, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service (e.g., a block-based storage service 220). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
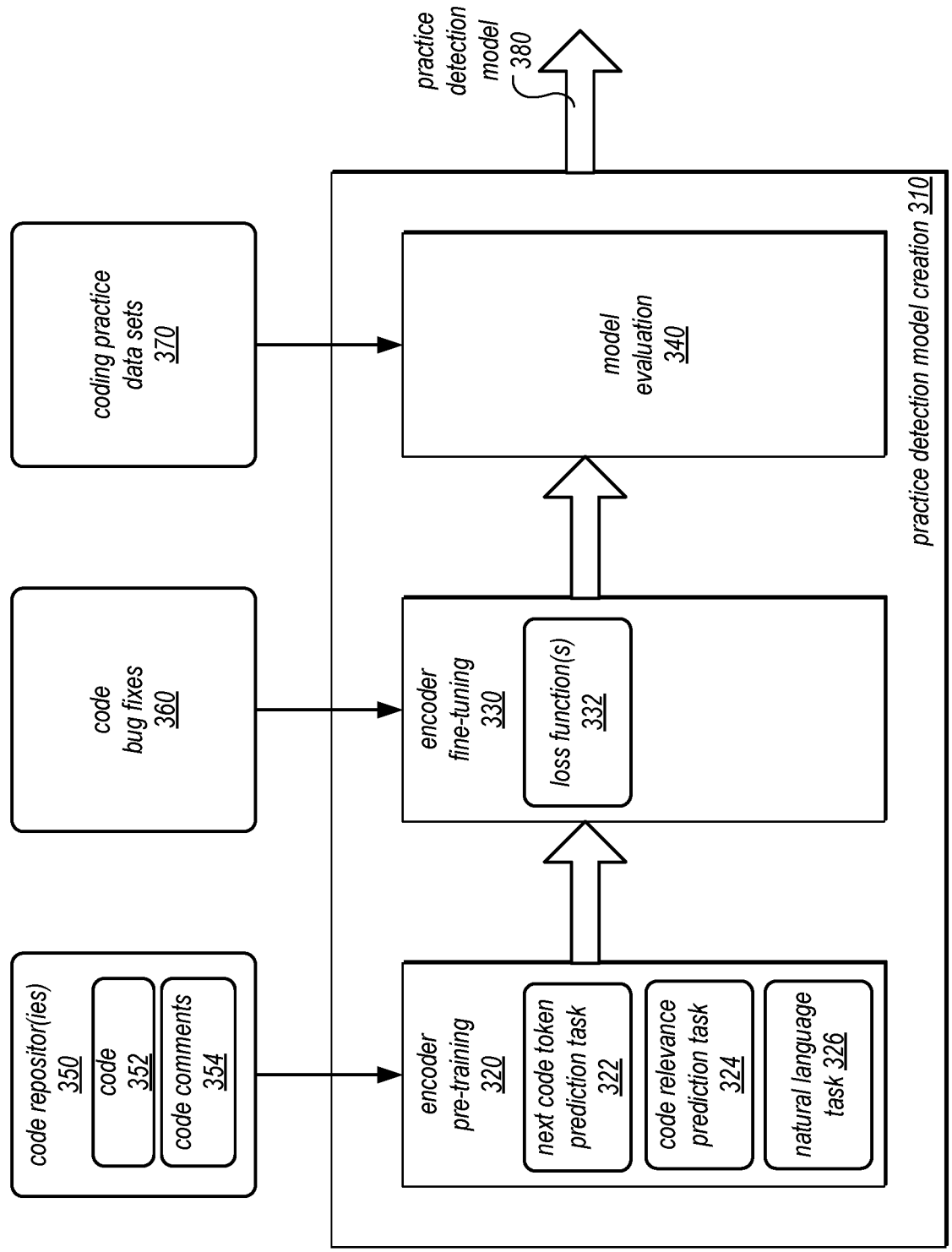
FIG. 3 is a logical block diagram illustrating practice detection model creation, according to some embodiments.

As noted above, code development service 210 may implement coding practice detection 214, in various embodiments, as discussed above with regard to FIG. 1. A machine learning model may be trained to detect coding practices for code repositories, such as code repositories 215. FIG. 3 is a logical block diagram illustrating practice detection model creation, according to some embodiments.

Practice detection model creation 310 may train (and evaluate) a machine learning model with an encoder to generate embeddings of natural language and code. Such a machine learning model may map natural language and code in a bimodal embedding space, in various embodiments, that captures the relationships among four types of data points—natural language best practice description, conforming codes, violating codes, and other irrelevant codes via the vector distance between their embeddings. When the conforming facet is specified (or determined as the default), the conforming codes should have a higher similarity with the input criteria embedding, relative to the violating codes. Similarly, when the violating facet is specified (or determined as the default), the violating codes should have a higher similarity with the input criteria embedding relative to the conforming codes. In both cases, the relevant (conforming or violating) examples should have higher similarity compared to other irrelevant examples.

While learning to rank techniques have been developed, there are very few settings similar to this scenario. A more commonly observed scenario involves triplet loss that models relationships among three data points—a natural language query, a relevant code, and an irrelevant code. Such techniques may minimize the vector distance between the embeddings of a natural language input and a relevant code, relative to that with respect to an irrelevant code.

In the following discussion, the below exemplary terminology may be used. Let r denote the natural language input and $y \in \{+, -\}$ denote the facet input, where + and − are the values corresponding to the conforming and the violating facets respectively. The combined input embedding may be denoted as $r^+$ and $r^-$ for the two facets. The objectives of relevant code retrieval and conformant code retrieval should be the same (e.g., that when no facet is prescribed, the conforming (high quality) codes should be ranked higher than the violating (low quality) codes, and both types should be ranked higher relative to irrelevant codes. Therefore, $r = r^+$.

Let c denote a code snippet. In the context of a specific query, a code may be labeled as conforming, violating, or irrelevant. Labeled codes may be denoted as $c^+$, $c^-$, $c^\sim$ respectively. Given a conforming facet, e.g., r, the embedding of r may be most similar to that of $c^+$, followed by $c^-$, and dissimilar to that of $c^\sim$. Given the violating facet, e.g., $r^-$, the embedding of r may be most similar to that of $c^-$, followed by $c^+$, and dissimilar to that of $c^\sim$.

In various embodiments, a Generative Pre-trained Transformer 2 (GPT-2) encoder may be used compute embeddings of natural language (NL) and programming language (PL) inputs, e.g., code snippets. GPT2 is based on a transformer architecture with a remarkable prediction and scaling performance across natural language tasks such as classification, translation and question answering. For example, an OpenAI implementation of GPT-2 may be utilized, which may include a stack of transformer blocks, where each block consists of a self-attention layer, a feed-forward layer, and a layer normalization with residual connections. The GPT2-small variant may be implemented in some embodiments (e.g., with 117M parameters resulting from an architecture with 12 blocks, 12 attention heads, and a hidden layer size of 768). This model may be pre-trained on data from natural language entries of the supported natural language description language (e.g., English language descriptive entries for supporting natural language descriptions written in English). To enable the use of this model for code-related tasks, the model may be further pre-trained on a large code corpus as described below, then fine-tuned to optimize for the quadruplet loss.

As indicated at 320, encoder pre-training may be performed using different tasks, such as next code token prediction task 322, code relevance prediction task 324, natural language tasks 326 (e.g., text prediction in a natural language description). To provide training data, code repositories 350, include code 352 and code comments 354 may be used. Pre-training is an exceptionally useful concept that allows data-hungry deep learning models to perform well on tasks with small training datasets. The idea is to train the model on large datasets with unsupervised learning objectives such as language modeling or masked language modeling. The pre-trained model can then be fine-tuned using small-scale ground truth for the target task.

Encoder pre-training 320 may, for example, be used to train the GPT2 model for code-related tasks using two pre-training objectives and a GitHub dataset collected from pull requests in various repositories. The first task, such as next code token prediction task 322, may be language modeling where a code or natural language sequence was input to the model and was asked to identify the next token correctly. As a second task, such as code relevance prediction task 324, a relevance prediction problem that takes bimodal input formulated by concatenating a code snippet and a review comment with special tokens marking their boundaries (e.g., <start> code text <delimiter> comment text <classify>. Each pair may be labeled to denote if the code and comment are extracted from the same or different code review. Pre-training the GPT2 model for these tasks helps improve performance on other software engineering tasks.

After pre-training a machine learning model encoder, such as GPT-2, encoder fine-tuning 330 may be implemented to train the machine learning model encoder using a loss function that accounts for the various characteristics of code portions with respect to a description of a practice (e.g., conforming, violating, or irrelevant). For example, fine-tuning training may optimize the GPT2 encoder for a quadruplet loss. Different implementations loss computations 332 may be used, as the quadruplet loss functions illustrated in FIGS. 4A and 4B, which may differ in the computation of the input criteria embedding. Other loss function(s) 332, however, may be implemented in other embodiments, such as higher order loss functions (e.g., quintuplet loss functions, sextuple loss functions, and so on).

Figure 4A:
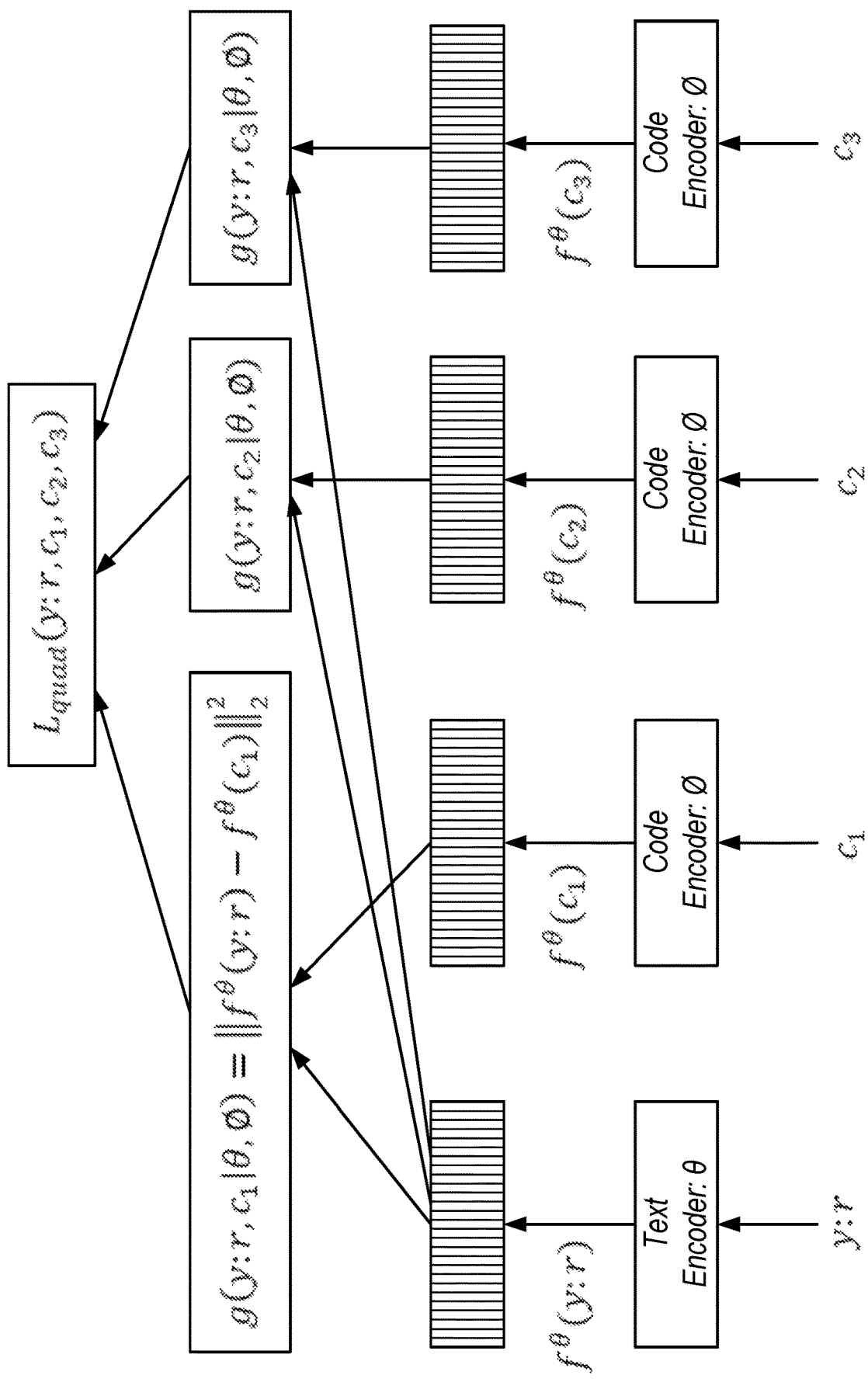
FIGS. 4A and 4B are logical block diagrams illustrating examples of quadruplet loss detection, according to some embodiments.

One formulation may be facet prefixed input embedding, as illustrated in FIG. 4A. In this formulation, the combined user input may be provided by prefixing the natural language description r with the facet string y. The concatenated representation y:r is passed through the GPT2 encoder to generate input criteria embedding. As the GPT2 model is based on a transformer architecture with self attention layers, the facet input organically attends to various components of the natural language description and the model optimizes their combination natively. The quadruplet loss for the conformance objective is given by:

$$L_{quad}^+ = \sum_{r,c^+,c^-}^{N} \{g(r, c^+)^2 - g(r, c^-)^2 + \alpha_1\}_+ + \sum_{r,c^-,c^\sim}^{N} [g(r, c^-)^2 - g(r, c^\sim)^2 + \alpha_2]_+$$

where g is the distance function and $\alpha_2 > \alpha_1 > 0$ are tunable margin parameters. Similarly, the quadruplet for the violation objective is of the form $r^-$, $c^-$, $c^+$, and $c^\sim$ and the corresponding loss is specified as:

$$L_{quad}^- = \sum_{r^-,c^-,c^+}^{N} \{g(r^-, c^-)^2 - g(r^-, c^+)^2 + \alpha_1\}_+ + \sum_{r^-,c^+,c^\sim}^{N} [g(r^-, c^+)^2 - g(r^-, c^\sim)^2 + \alpha_2]_+$$

Joint optimization for both of the above objects may be performed, so the total loss function may be:

$$L_{quad} = \frac{1}{2}(L_{quad}^+ + L_{quad}^-)$$

Figure 4B:
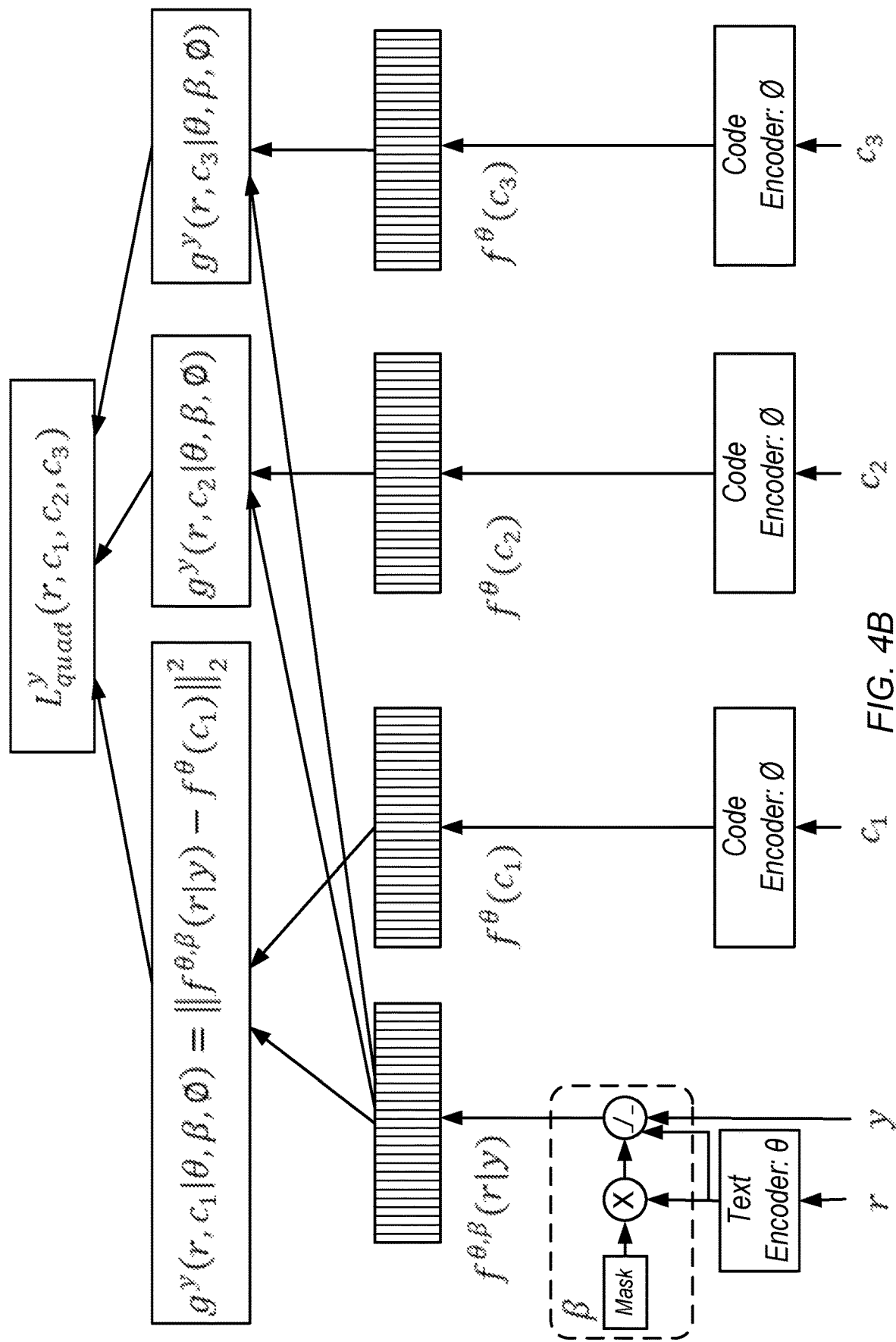

A facet-conditional input embedding may be used for loss computation, in some embodiments, as illustrated in FIG. 4B. For this formulation of a quadruplet loss function, a network to externally combine the facet input with the natural language description may be implement. As shown in FIG. 4B, the natural language description y is input to the GPT2 encoder by itself. The resulting embedding is then factored into different subspaces conditioned on the facet value y. The factorization is implemented via a conditional mask $m \in R^{d \times n_k}$, where d is the embedding vector length and $n_k$ is the number of facets (=2). The mask can be paramterized as $m = \sigma(\beta)$, with $\sigma$ denoting a rectified linear unit so that $\sigma(\beta) = \max\{0,\}$. The $k^{th}$ column $m_k$ plays the role of an element-wise gating function selecting the relevant subspace of the embedding dimensions to attend to the $k^{th}$ facet. The loss for violating facet is given by:

$$L_{cond}^- = \sum_{r^-,c^-,c^+}^{N} \{g(f(m, r), c^-)^2 - g(f(m, r), c^+)^2 + \alpha_1\}_+ + \sum_{r,c^+,c^\sim}^{N} [g(f(m, r), c^+)^2 - g(f(m, r), c^\sim)^2 + \alpha_2]_+$$

where $f(m, r) = m \times r$ is the facet-conditional masked embedding of the input. The loss for conforming facet is computed similarly. The overall loss may be regularized to encourage embeddings to be drawn from a unit ball ($L_M$) and for mask regularization ($L_W$). The final loss is given by:

$$L_{cond} = L_{cond}^+ + L_{cond}^- + \lambda_1 L_W(r,y,\theta) + \lambda_2 L_M(m)$$

The parameters $\lambda_1$ and $\lambda_2$ weight the combination of the triplet terms against the regularization terms.

Margin selection is one aspect of model optimization that may be considered when performing fine-tuning and may be selected empirically by analyzing the distribution of distances between the embeddings of text and code inputs. For example, a distribution where A, P, N denote the anchor, positive and negative parts of a triplet (e.g., [conforming rule specification, conforming code, violating code] or [violating rule specification, violating example, conforming example]) and help partition three sections:

Easy: $d(f_A-f_P)+\alpha < d(f_A-f_N)$.

Medium: $d(f_A-f_P) < d(f_A-f_N) < d(f_A-f_P)+\alpha$. These triplets may be suited for optimization.

Hard: $d(f_A-f_N) < d(f_A-f_P)$. Selecting the hardest negative examples can in practice lead to bad local minima early on in training. It can sometimes result in a collapsed model.

By treating the margins as hyper-parameters and using relevant distributions, useful values for both conforming violating separation and relevant-irrelevant separation can be identified.

While natural language is typically represented as a sequence of tokens, code can have diverse representations: sequence of tokens, abstract syntax tree (AST), control and data flow graphs, etc. The representations convey rich information about a code snippet and influence prediction performance. In various embodiments, code may be treated as natural language and/or token sequences. As code tokens can be composed of two or more subtokens, subword tokenization can be used to construct input sequences from source code. For example, "subToken" may be represented as two smaller tokens "sub" and "token". BytePair Encoding (BPE) may be used on English vocabulary used by pre-trained GPT2, in some embodiments. Token-based representation can allow for representing partial or non-compilable code snippets.

While the usual practice for model fine-tuning is to use small-scale labeled training data of the target task itself, no curated data exists for faceted best practice detection. Instead, a close proxy dataset may be used that is easily available in public and private code repositories. For example, code repository bug fixes 360 may be used. A subset of the GitHub pull requests dataset described above (e.g., from code comments) that was specifically marked as bug-fixes may be used. The review comment may be treated as a proxy for coding best practice suggestion, and the code-before and code-after versions as the violating and conforming codes respectively. In-batch irrelevant examples may be sampled to form quadruplets.

As the specific problem of faceted best practice detection has not been explored earlier, there are no established ground truth datasets or benchmarks on this topic. Therefore, coding practice data sets 370 may be determined using the following example data sets for model evaluation 340.

One source may be the Common Weaknesses Enumeration (CWE) dataset. It is a community contributed list of software and hardware weakness types across multiple programming languages Each weakness is associated with a short natural language description and examples illustrating either or both facets.

Note that CWE was not created with the intention of being used for natural language modeling or deep learning systems. This reflects in the natural language descriptions which are overly broad in nature and cover obscure ideas without referring to specific data types or APIs. For example:

The product does not sufficiently enforce boundaries between the states of different sessions, causing data to be provided to, or used by, the wrong session.

The product receives input that is expected to specify an index, position, or offset into an indexable resource such as a buffer or file, but it does not validate or incorrectly validates that the specified index/position/offset has the required properties.

Truncation errors occur when a primitive is cast to a primitive of a smaller size and data is lost in the conversion.

Similar descriptions are also used in other well-known datasets OWASP and Juliet. Another source of coding practice data sets 370 may be private or un-published data sets for programming languages. Some example descriptions may include:

When wrapping a caught exception into a custom one, pass it as the rootCause or inner exception parameter to the constructor of the new exception.

Do not use a constant or a predictable seed with java security SecureRandom class. Use the seed provided by the SecureRandom implementation itself.

Use the try-with-resources statement or explicitly call the close( ) method to correctly close streams Do not modify a collection while iterating on it Unlike CWE, the text descriptions may be formulated as commands, suggestions, or warnings. Further note that, the description can be phrased in a positive tone (do . . . ), in a negative tone (do not . . . ) or a mixed tone. It is left to the training of the machine learning model to infer what constitutes as the conforming or a violating example. A violation may be typically the aspect corresponding to poorer code quality, for example.

Another point of consideration is the quality of input description. While a user may very well provide a verbose or ambiguous textual input, better results may be obtained by providing more concise and specific queries. A Jaccard similarity between the best practice description and ground truth examples may be a measure of token overlap (ratio of set intersection to set union, computed between the sets of tokens of a best practice natural language description and an example). A high Jaccard similarity would indicate that purely text matching algorithms would perform well in the detection task. In this case however, a small Jaccard scores indicating that for a model to correctly match a natural language query and code example, higher order semantics need to be effectively captured.

Model evaluation 340 may be performed to measure in terms of the trained machine learning model's ability to correctly determine the conforming and violating examples given a natural language query. The model computes a score for each example in the code corpus. The score is used to rank all codes and find the most likely conforming and violating examples. Ranking performance may be quantified through mean reciprocal rank (MRR):

$$MRR = \frac{1}{Q}\sum_{i=1}^{|Q|} \frac{1}{\text{rank}_i}$$

where Q denotes the number of queries and $\text{rank}_i$ denotes the rank position of the first example from the known ground truth.

Two baseline losses may be used:

Contrastive loss—This baseline represents the GPT2 model pre-trained with code-comment relevance objective on GitHub dataset. Each training example is a pair of (comment, code) with a binary label indicating relevance. This baseline does not encode the additional facet of conforming versus violating and is intended to measure the ability of vanilla code search models to address faceted best practice detection task.

Triplet loss—This baseline represents additional fine-tuning of contrastive loss model with a triplet ranking objective to encourage facet-specific code ranking over irrelevant examples. It may not encode the additional relationships with respect to the opposing facet.

The ground truth datasets may be small (e.g., with fewer than 500 code snippets). Therefore, multiple types of code corpora may evaluated.

Figure 5:
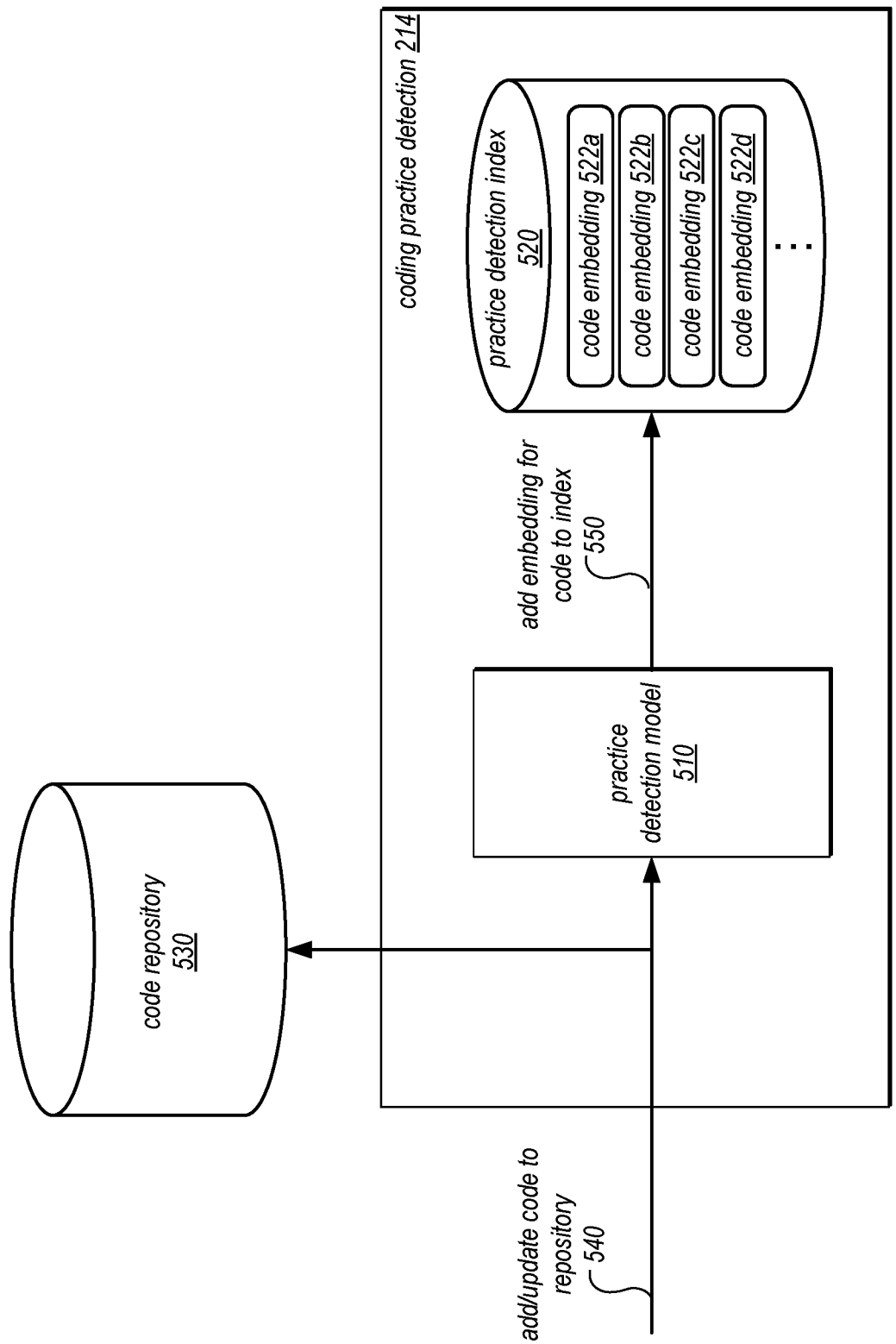
FIG. 5 is a logical block diagram illustrating updating a practice detection index, according to some embodiments.

A practice detection model created, as indicated at 380, may then be used to implement practice detection 214. To efficiently search code repositories for practices, an practice detection index may be utilized, in some embodiments. FIG. 5 is a logical block diagram illustrating updating a practice detection index, according to some embodiments. Code detection 214 may implement techniques for updating a practice detection index 520 when code is added to a code repository.

For example, as indicated at 540, code may be added to (or updated in) a repository (e.g., when saved, checked-in, written, stored, or otherwise added to code repository 530. Coding practice detection 214, as part of development environment 211, may recognize or detect when code is added 540. For example, a store, check-in, or other command may trigger a workflow to update a practice detection index for the added (e.g., modified or new) code. Practice detection model 510, trained according to the techniques discussed above with regard to FIG. 3, may be used to generate an embedding for the added code. In some embodiments, multiple embeddings may be created for different portions of the added code. As indicated at 550, the embedding for the code may be added to practice detection index 520. For instance, practice detection index 520 may include various different code embedding entries 522a, 522b, 522c, and 522d, corresponding to different portions of code. In some embodiments, an update to existing code may cause a generation of an embedding with the updated code, which may overwrite or replace an existing code embedding entry with the embedding generated for the updated code.

Figure 6:
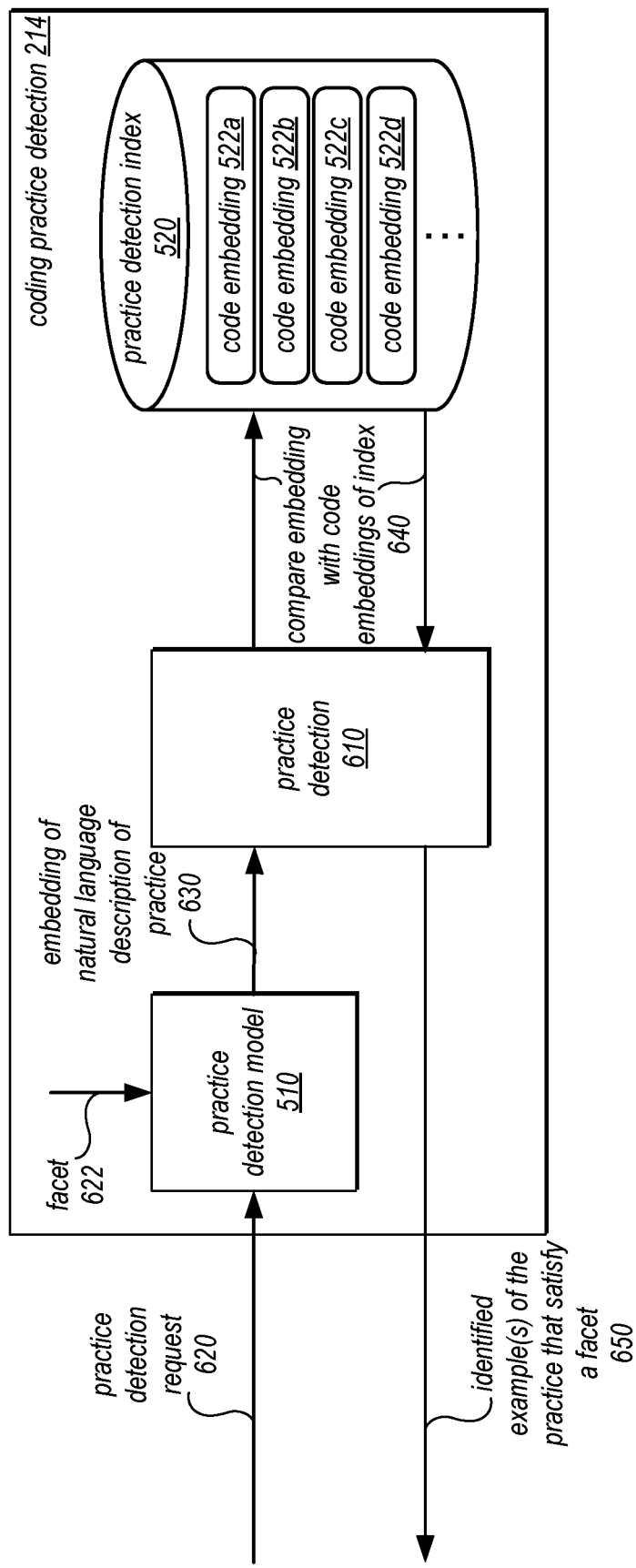
FIG. 6 is a logical block diagram illustrating coding practice detection, according to some embodiments.

As the practice detection index is created and updated, practices in a corresponding code repository can be detected. FIG. 6 is a logical block diagram illustrating coding practice detection, according to some embodiments. As indicated at 620, a practice detection request may be received. The practice detection request 620 may include an identity of a code repository to search, in some embodiments. The request 620 may include the natural language description of the best practice, in some embodiments. The request 620 may include a facet 622, in some embodiments, and in other embodiments, no facet may be included. In such embodiments, facet 622 may be specified by default.

Coding practice detection 214 may use practice detection model 510 (also used to create practice detection index 520, to generate an embedding of the natural language description of the practice (and the facet in some embodiments). Practice detection 610 may then perform a comparison of the embedding with code embeddings in practice detection index 520, as indicated at 640. For example, practice detection 610 may determine similarity (e.g., according to vector distance measurements using cosine similarity, where each embedding is a vector) and return examples that satisfy the facet according to the similarities (e.g., X top code portions according to a ranking of similarity measurements, or any code portions with a similarity value less than Y threshold). Coding practice detection 214 may then identify the example(s) of the practice that satisfy the facet, as indicated at 650.

Figure 8:
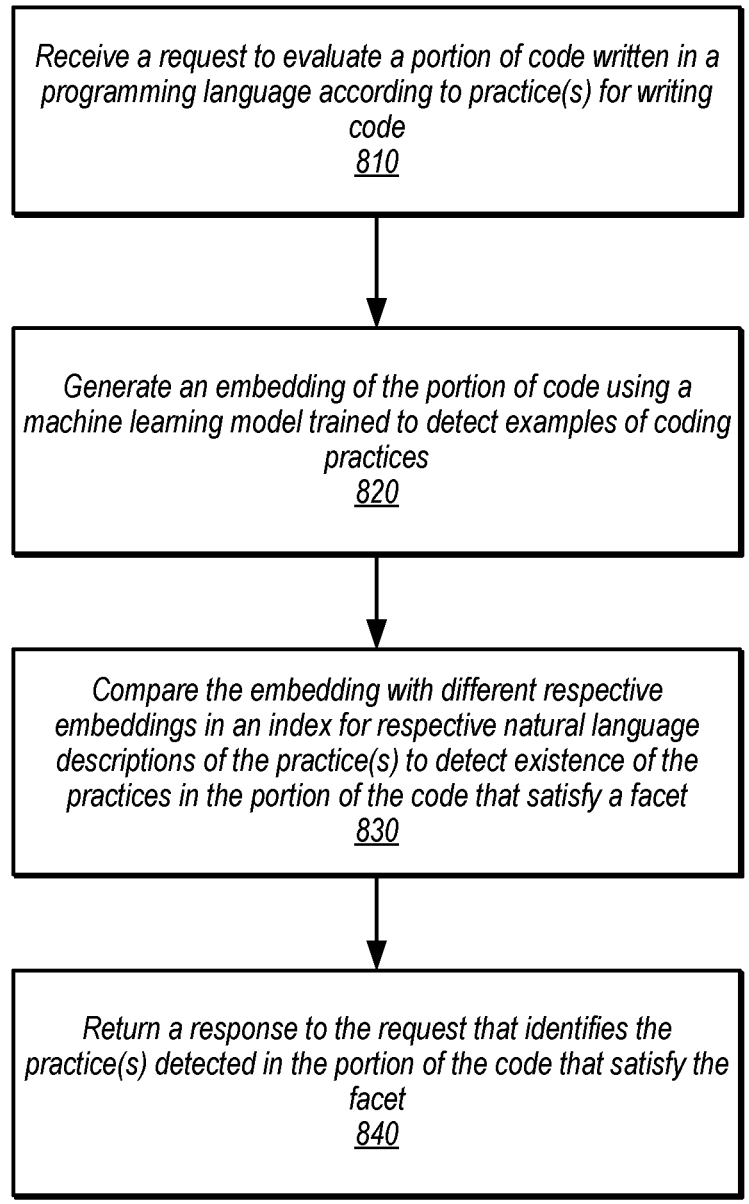
FIG. 8 is a high-level flowchart illustrating techniques and methods to implement evaluating received code with respect to coding practices described using natural language, according to some embodiments.

Although examples given above with regard to FIGS. 5 and 6 were illustrated of an index of code portions, for detecting a received practice description, similar techniques may be implemented for detecting the existence of one (or multiple) practices in a received portion of code, as discussed in detail below with regard to FIG. 8.

Figure 7:
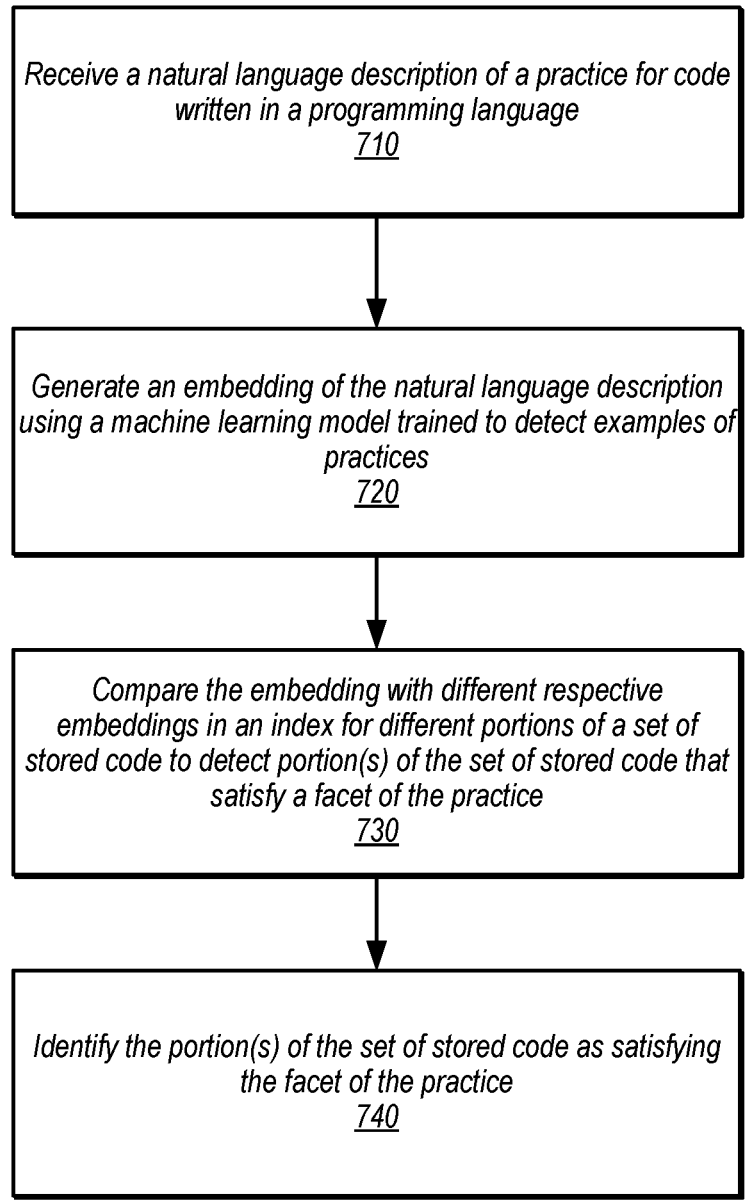
FIG. 7 is a high-level flowchart illustrating techniques and methods to implement analyzing code according to natural language descriptions of coding practices, according to some embodiments.

The examples of analyzing code according to natural language descriptions of coding practices discussed above with regard to FIGS. 2-6 have been given in regard to one example of a code development service. Various other types of code development tools, systems, or applications may implement these techniques. FIG. 7 is a high-level flowchart illustrating techniques and methods to implement analyzing code according to natural language descriptions of coding practices, according to some embodiments. These techniques, as well as the techniques discussed below with regard to FIG. 8, may be implemented using various components of a provider network as described above with regard to FIGS. 2-6 or other types or systems implementing code development tools or other applications.

As indicated at 710, a natural language description of a practice for code written in a programming language may be received, according to some embodiments. The natural language description may be received in a request for detecting coding practices in a code repository. In some embodiments, the natural language description may be received as part of an audit or other tool that accepts different natural language descriptions to be stored as part of a coding practices rule set or other data which may be periodically evaluated against a code repository.

As indicated at 720, an embedding of the natural language description may be generated using a machine learning model trained to detect examples of practices, according to some embodiments. For example, an encoder may be used to generate the embedding. As discussed above, the facet may be included in the embedding in some embodiments. The facet may be specified in a request, or a default value may be used, such as "violating."

As indicated at 730, the embedding may be compared with different respective embeddings in an index for different portions of a set of stored code to detect portion(s) of the set of stored code that satisfy a facet of the practice, according to some embodiments. For example, similarity between the practice embedding and code portion embeddings may be determined (e.g., according to vector distance measurements using cosine similarity, where each embedding is a vector) and return examples that satisfy the facet (e.g., with a conforming, violating, or other facet label) according to the similarities (e.g., X top code portions according to a ranking of similarity measurements, or any code portions with a similarity value less than Y threshold).

As indicated at 740, the portion(s) of the set of stored code may be identified as satisfying the facet of the practice, according to some embodiments. The portions of the set of stored code may be returned in a response to a request or stored in a report or audit file/log. In some embodiments, the identified portions may trigger a warning or alert, which may notify a responsible party of a practice violation (e.g., a security violation) that has been included in code. In some embodiments, a confidence value or score (e.g., determined from the difference in similarity values between embeddings) may be provided as part of the response.

Similar to the techniques discussed above for maintaining an index of code in order to perform requests to detect examples of best practices in a code set, techniques for evaluating an individual portion of code (e.g., a code file, snippet, object, etc.) may be implemented. For example, code evaluations may be performed in real time (e.g., as code is written via an input interface, such as a text editor) or by other request to evaluate a piece of code for best practices. FIG. 8 is a high-level flowchart illustrating techniques and methods to implement evaluating received code with respect to coding practices described using natural language, according to some embodiments.

As indicated at 810, a request to evaluate a portion of code written in a programming language according to practice(s) for writing code may be received, according to some embodiments. Various different programming languages may be supported, including, but not limited to, Java, Python, Java Virtual Machine (JVM) languages (e.g., Scala, Kotlin, etc.), C, C++, C#, and Ruby, among others. The request may be an explicit request to perform an evaluation (e.g., a request via a tool or other analysis interface for code entered in a development environment application, such as a text editor) or may be an implicit request generated by entering or providing code (e.g., a real-time analysis executed on code as it entered into a text editor). In some embodiments, the best practices may be explicitly specified to evaluate for, whereas in other embodiments, no best practices may be specified.

As indicated at 820, an embedding of the portion of code may be generated using a machine learning model trained to detect examples of practices, according to some embodiments. For example, an encoder may be used to generate the embedding.

As indicated at 830, the embedding may be compared with different respective embeddings in an index for respective natural language descriptions of the practice(s) to detect existence of the practice(s) in the portion of the code that satisfy a facet of the practice, according to some embodiments. For example, similarity between the code embedding and practice(s) embeddings may be determined (e.g., according to vector distance measurements using cosine similarity, where each embedding is a vector) and return examples that satisfy the facet (e.g., with a conforming, violating, or other facet label) according to the similarities (e.g., X top code portions according to a ranking of similarity measurements, or any code portions with a similarity value less than Y threshold).

As indicated at 840, the practice(s) detected in the portion of the code that satisfy the facet (e.g., violating or conforming) may be identified in a response returned to the request, according to some embodiments. In some embodiments, a confidence value or score (e.g., determined from the difference in similarity values between embeddings) may be provided as part of the response.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 9:
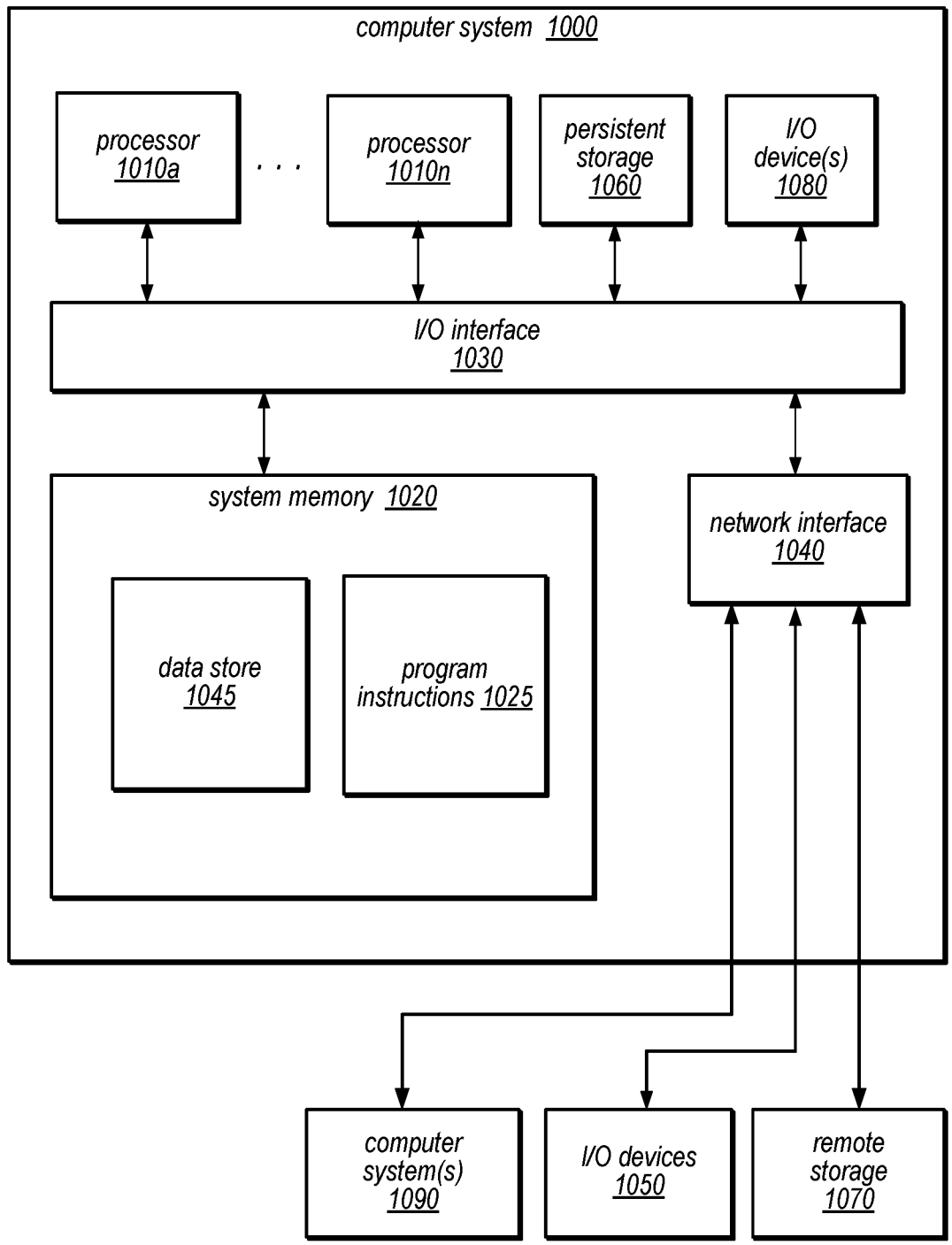
FIG. 9 is a block diagram illustrating an example computing system, according to some embodiments.

Analyzing code according to natural language descriptions of coding practices as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement:
   receive, via an interface for a code development system, a request to identify one or more portions of a set of stored code according to a practice for code written in a programming language, wherein the request comprises a natural language description of the practice;
   determine a facet of the practice for identifying the one or more portions of the set of stored code;
   generate an embedding of the natural language description and the facet of the practice using a machine learning model trained to detect examples of coding practices;
   compare the embedding with different respective embeddings in an index for different portions of the set of stored code to detect the one or more portions of the set of stored code that satisfy the facet of the practice, wherein the different respective embeddings in the index for the different portions of the set of stored code are created using the machine learning model; and
   return, via the interface for the code development system, a result for the request that identifies the one or more portions of the set of stored code as satisfying the facet of the practice.

2. The system of claim 1, wherein to determine the facet of the practice, the program instructions cause the at least one processor to determine the facet specified in the request.

3. The system of claim 1, wherein the at least one memory stores further program instructions that when executed by the at last one processor, further cause the at least one processor to:
   after an addition of new code to the set of stored code, generate a new embedding to include in the index for the new code.

4. The system of claim 1, wherein the code development system is a code development service offered by a provider network and wherein the set of stored code is a code repository external to the provider network and accessible to the code development service.

5. A method, comprising:
   receiving, by one or more computing devices respectively comprising a processor, a natural language description of a practice for code written in a programming language;
   generating, by the one or more computing devices, an embedding of the natural language description using a machine learning model trained to detect examples of coding practices;
   comparing, by the one or more computing devices, the embedding with different respective embeddings in an index for different portions of a set of stored code to detect one or more portions of the set of stored code that satisfy a facet of the practice, wherein the different respective embeddings in the index for the different portions of the set of stored code are created using the machine learning model; and
   identifying, by the one or more computing devices, the one or more portions of the set of stored code as satisfying the facet of the practice.

6. The method of claim 5, wherein the facet is a default facet.

7. The method of claim 5, wherein the facet is satisfied when the one or more portions of the set of stored code conform to the practice.

8. The method of claim 5, further comprising:
   after adding new code to the set of stored code, generating, by the one or more computing devices, a new embedding to include in the index for the new code.

9. The method of claim 5, wherein identifying the one or more portions of the set of stored code as satisfying the facet of the practice comprises returning a response identifying the one or more portions of the set of stored code that comprises respective confidence scores for the identified one or more portions.

10. The method of claim 5, wherein the machine learning model is pre-trained using one or more code prediction tasks and a natural language task.

11. The method of claim 10, wherein the pre-trained machine learning model is fine-tuned using a quadruplet loss function or a higher order loss function.

12. The method of claim 5, wherein generating the embedding of the natural language description using the machine learning model trained to detect examples of coding practices comprises using the facet to conditionally mask an initial embedding of the natural language description from an encoder.

13. The method of claim 5, wherein the natural language description of the 5 practice of the code is received as part of a request to detect the practice in the set of stored code.

14. One or more non-transitory, computer-readable storage media, storing program instructions that when executed on or across one or more computing devices cause the one or more computing devices to implement:
   receiving a request to evaluate a portion of code written in a programming language according to one or more practices for writing code;
   generating an embedding of the portion of code using a machine learning model trained to detect examples of coding practices;
   comparing the embedding with different respective embeddings in an index for respective natural language descriptions of the one or more practices to detect existence of the one or more practices that satisfy a facet in the portion of code, wherein the different respective embeddings in the index for the respective natural language descriptions of the one or more practices are created using the machine learning model; and returning a response to the request that identifies the one or more practices detected in the portion of the code that satisfy the facet.

15. The one or more non-transitory, computer-readable storage media of claim 14, wherein the facet is specified as part of the request.

16. The one or more non-transitory, computer-readable storage media of claim 14, wherein the facet is satisfied when the portion of code violates the one or more practices.

17. The one or more non-transitory, computer-readable storage media of claim 14, storing further instructions that when executed on or across the one or more computing devices, cause the one or more computing devices to further implement:

receiving the respective natural language descriptions of the one or more practices; and generating the different respective embeddings of the one or more practices to store in the index.

18. The one or more non-transitory, computer-readable storage media of claim 14, wherein the machine learning model is pre-trained using one or more code prediction tasks and a natural language task.

19. The one or more non-transitory, computer-readable storage media of claim 18, wherein the pre-trained machine learning model is fine-tuned using a quadruplet loss function or other higher order loss function.

20. The one or more non-transitory, computer-readable storage media of claim 14, wherein the one or more computing devices are implemented as part of a provider network that offers a code development service, wherein the portion of code is received through a development environment hosted by the code development service, and wherein the request is received and the response is returned via an interface for the code development service.

\* \* \* \* \*